Patented Nov. 24, 1970

3,542,797
CERTAIN SUBSTITUTED-1-PHENYL-1-PYRIDOYL-
UREAS AND DERIVATIVES
Pierre Poignant and Daniel Pillon, Lyon, and Rodolphe
Caffiero, Francheville - le - Bas, France, assignors to
Pechiney-Progil, Lyon, France, a corporation of France
No Drawing. Filed Feb. 14, 1968, Ser. No. 705,292
Claims priority, application France, Feb. 16, 1967,
48,303
Int. Cl. C07d 31/36
U.S. Cl. 260—295                                  7 Claims

ABSTRACT OF THE DISCLOSURE

The invention describes urea derivatives and process for their preparation which are useful as agricultural antiparasitic agents, herbicides and growth regulators and which have the general formula

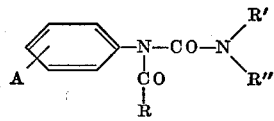

in which R represents a 5- or 6-membered heterocyclic radical containing one or two identical or different hetero atoms; R' represents hydrogen, a methyl radical or a $CH_2CH_2CN$-radical; R" represents one of the following radicals: an optionally saturated alkyl radical containing from 1 to 4 carbon atoms, a lower-alkoxy radical, a lower alkoxy lower alkyl radical or a $CH_2CH_2CN$-radical; A represents one or two identical or different radicals selected from the following: halogen, $NO_2$, lower alkyl, lower alkoxy, $CF_3$, SCN.

This invention relates to new chemical compounds derived from urea, to a process for their preparation and to their use as agricultural antiparasitic agents and, in particular, as herbicides and growth regulators.

The ureas according to the invention correspond to the general formula

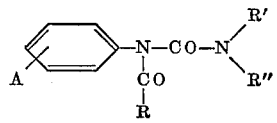

in which R represents a 5- or 6-membered heterocyclic radical containing one or two identical or different hetero atoms; R' represents hydrogen, a methyl radical or a $CH_2CH_2CN$-radical; R" represents one of the following radicals: an optionally saturated alkyl radical containing from 1 to 4 carbon atoms, a lower alkoxy radical, a lower alkoxy lower alkyl radical or a $CH_2CH_2CN$-radical; A represents one or two identical or different radicals selected from the following: halogen, $NO_2$, lower alkyl, lower alkoxy, $CF_3$, SCN.

These compounds are prepared by condensing a di- or tri-substiutted urea with a heterocyclic acid chloride. The di- or tri-substituted urea used as starting material is prepared by known methods such as condensing phosgene with an aniline and then reacting a primary or secondary amine with the chlorocarbonate formed, or reacting the same amines with an arylisocyanate, or reacting a suitably substituted urea with an aniline.

Condensation of the di- or tri-substituted urea with a heterocyclic acid chloride takes place in accordance with the following equation:

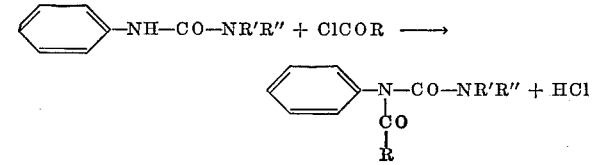

This reaction may be carried out in any organic solvent such as benzene in the presence of a suitable halogenated hydracid acceptor such as pyridine.

In one preferred embodiment of this process, pyridine itself is used as solvent for the reaction mixture, being employed in a large excess relative to the theoretical quantity. This reaction is readily carried out at room temperature and may be accelerated by heating to such an extent as to bring the reaction mixture up to a temperature of around 110° C. In general, less intense heating (i.e. from 40 to 70° C.) will be sufficient because symmetrical N,N'-diaryl ureas can be formed at higher temperatures in dependence upon the heterocyclic acid chlorides used.

In cases where the heterocycle contains nitrogen as hetero atom, the acid chloride used will be in hydrochloride form which is the most readily accessible.

The reaction mixture may be treated in three ways:—

1. It may either be poured into an excess of chilled, diluted HCl. The excess pyridine is eliminated in the form of pyridine hydrochloride which is soluble in water. The tri- or tetra-substituted urea is precipitated. This precipitation often assumes an oily form, solidification beginning after only a few hours. A fine crystalline solid can be more rapidly obtained by adding to the reaction mixture 10% of its own weight of alcohol before decomposition.

2. Most of the excess pyridine may be distilled off in vacuo (20 to 100 mm. of mercury) at a temperature below 50° C. The gummy residue is then stirred with ice water. The rest of the pyridine in excess together with the pyridine hydrochloride formed during condensation is rendered soluble in water, the urea being precipitated.

3. The reaction mixture may be directly poured into water with preliminary recovery of the pyridine. This alternative is applied in the particular case of heterocyclic acids containing a nitrogne atom in order to avoid the formation of a hydrochloride of tri- or tetra-substituted urea. On the other hand, the urea is precipitated in a well crystallised form under these conditions.

EXAMPLE 1

19.85 g. (0.1 mol) of N-4-chlorophenyl-N,N'-dimethyl urea are dissolved in 120 cc. of pyridine. 17.8 g. (0.1 mol) of the hydrochloride of isonicotinic acid chloride are added to the resulting solution. This hydrochloride is in the form of a powder which is fed into the flask by means of an archimedian screw in a stream of nitrogen. A precipitate of pyridine hydrochloride is then formed in large quantities. The reaction product is left standing for 24 hours and then poured slowly in ice water with vigorous stirring. A very fine precipitate is formed, being separated by filtration, washed with ice water and then dried in vacuo. N-4-chlorophenyl-N-isonicotinyl-N,N'-dimethyl urea is obtained in a yield of 21.8 g. or 71.8%, M.P. 161° C.

The rseults of analysis are as follows:
Calculated: C, 59.30; H, 4.61; N, 13.83. Found: C, 59.63; H, 4.76; N, 13.85.

The product obtained is soluble in a dilute acid medium by virtue of the hydrochloride formed. Generally speaking, each time the heterocycle contains a nitrogen hetero atom, the urea obtained may be used in a quaternised form obtained by the action of compounds such as acids (hydrochloric acid, alkyl-oxyaryl-sulphonic acid and so on), alkyl halides and so on, on the urea.

Thus, by treating the compound of Example 1 with a solution of hydrochloric acid, the hydrochloride of the urea (M.P. 152° C.) readily soluble in water is obtained in a yield of 98.5%.

EXAMPLES 2 to 7

The following products are obtained by applying the procedure described in Example 1:

| Number: | R' | R'' | R | A | Yield, percent | M.P., ° C. |
|---|---|---|---|---|---|---|
| 2 | $CH_3$ | $CH_3$ | 4-pyridyl | 3,4-dichloro | 69.3 | 117–118 |
| 3 | $CH_3$ | $CH_3$ | 3-pyridyl | 3,4-dichloro | 93.9 | 124 |
| 4 | $CH_3$ | $CH_3$ | 3-pyridyl | 4-chloro | 86.1 | 104–105 |
| 5 | $CH_3$ | $CH_3$ | 3-pyridyl | H | 68.3 | 121 |
| 6 | $CH_3$ | $CH_3$ | 4-pyridyl | 4-$CH_3O$ | 30.9 | 125 |
| 7 | $CH_3$ | $CH_3$ | 4-pyridyl | 3-$CF_3$ | 64.1 | 116–118 |

EXAMPLE 8

19.85 g. (0.1 mol) of N-4-chlorophenyl-N,N'-dimethyl urea are dissolved in 200 cc. of pyridine. 14.65 g. (0.1 mol) of thenoyl chloride are poured on to the resulting solution over a period of 30 minutes. Pyridine hydrochloride is precipitated in small quantities. The reaction mixture is left standing for 24 hours after which it is poured on to a cooled dilute solution of hydrochloric acid. A precipitate is formed which is centrifuged, washed neutral with water and then dried.

N-4-chlorophenyl-N-thenoyl-N,N'-dimethyl urea is obtained in a yield of 26.1 g. or 84.6%, M.P. 120–123° C.

EXAMPLES 9 TO 13

The following compounds are prepared by applying the procedure described in Example 8:

| Number: | R' | R'' | R | A | Yield, percent | M.P., ° C. |
|---|---|---|---|---|---|---|
| 9 | $CH_3$ | $CH_3$ | furyl | 3,4-dichloro | 74.9 | 74 |
| 10 | $CH_3$ | $CH_3$ | furyl | 4-chloro | 68.7 | 102 |
| 11 | $CH_3$ | $CH_3$ | furyl | H | 49.6 | 93–95 |
| 12 | $CH_3$ | $CH_3$ | thienyl | 3,4-dichloro | 90.6 | 90–93 |
| 13 | $CH_3$ | $CH_3$ | thienyl | H | 79.2 | 104–105 |

The compounds according to the invention show remarkable antiparasitic properties enabling them to resolve a large number of problems that are encountered in the agricultural field.

It is possible in dependence upon the nature of the radicals A, R, R' and R'' and upon the doses and conditions of use to obtain products that are either growth regulators, i.e. products capable of influencing the normal development of the plants to which they are applied. Thus, they are able in particular to shorten the stems of cereal crops enabling the so-called "beating-down" phenomenon to be avoided, or to produce defoliation or to thin out or, in contrast, to multiply flowers or fruit and so on, or herbicides whose activity is total and which destroy weeds, undergrowth, shrubs and so on, or herbicides whose activity is selective which enables them to be used to destroy all the casual weeds capable of inhibiting the development of the plants which it is desired to protect.

The herbicidal activity of the compounds according to the invention is also governed by the conditions of use. Some of them develop their maximum activity (or selectivity) in cases where treatment is carried out before seeding or planting, some are essentially suited to pre-emergence treatment (after seeding and before sprouting either of the plants or of the weeds), whilst others are best suited to post-emergence treatment of the plants and/or weeds.

It will therefore be possible for the user to find among the range of products according to the invention products which will enable him most effectively to resolve the problem by which he is confronted.

The following examples demonstrate some aspects of the activity of the compounds according to the invention. The sole object of these examples is to illustrate the present description without in any way limiting its scope to the applications mentioned therein. Naturally, the invention covers all the antiparasitic applications of the compounds of Formula 1 irrespective of the doses in which and the conditions under which they are used.

EXAMPLE 14

A wettable powder ready for use is prepared by adding 20 parts of active material to a mixture containing 74 parts of an inert filler (Argirec B 22), 5 parts of a defloccculent (Agrinol C 14) and 1 part of a wetting agent (Erganol AT 30).

The wettable powder thus obtained is diluted to the required concentration just before it is applied in dependence upon the quantity of active material which it is desired to apply per hectare.

EXAMPLE 15

When used in a dose of 8 kg./ha. in preemergence as blackgrass (*Alopecurus myosuroids*), rye-grass (*Lolium italicum*), panic grass (*Echinochloa crus-galli*), millet (*Panicum miliaceum*), barley (*Hordeum distichum*) and such dicotyledones as carrots (*Daucus carota*), Haricot beans (*Phaseolus vulgaris*), flax (*Linum usitatissimum*), turnips (*Brassica napus*), buckwheat (*Polygonum fagopyrum*), tomatoes (*Solanum esculentium*) and peas (*Pisum sativum*). When applied in the same dose, product No. 12 is also phytotoxic on most of the test plants, both mono- and di-cotyledones.

By contrast, the same product, when applied in a dose of 1 kg./ha., is completely selective on maize (*Zea mays*), barley and oats (*Avena sativa*), completely destroying casual weeds such as millet, panic grass and rye grass.

EXAMPLE 16

When applied in a dose of 8 kg./ha., product No. 13 is selective on Haricot beans and completely destroys millet, turnips, buckwheat, tomatoes and turnsole (*Helianthus annus*).

When applied in an equivalent dose of 8 kg./ha., product No. 1 is completely selective on wheat (*Triticum vulgaris*), Haricot beans, soya beans and cotton, and completely destroys oats, millet, rye grass, blackgrass, carrots, turnips, buckwheat, tomatoes and turnsole.

EXAMPLE 17

When applied in a dose of 4 kg./ha., product No. 3 is selective on corn, barley, oats and Haricot beans and completely destroys such grasses as millet, panic grass and rye grass, and dicotyledones such as carrots, turnips, buckwheat, tomatoes and turnsole.

EXAMPLE 18

When applied in a dose of 8 kg./ha., product No. 4 is selective on corn and maize and completely destroys such grasses as rye grass and foxtail grass, dicotyledones such as carrots, turnips, buckwheat and turnsole. It is 80% effective on Haricot beans and tomatoes.

EXAMPLE 19

A solution (containing 0.5 kg./ha.) of the compound of Example 1 (used in the form of its hydrochloride) is sprayed onto young corn seedlings one week old.

Samples taken 4 weeks after the treatment show a reduction in height of 30% in the treated corn relative to control plants.

Despite this reduction in height, the corn treated does not show any signs of weakness, its density per square metre being equal to that of control plants.

These few examples demonstrate very clearly the remarkable polyvalent action of the products according to the invention.

The products according to the invention may be used on their own, although generally they will be converted into a more practical form of use for application.

The type of formulation selected will be governed by the physico-chemical properties of the products and by the type of application for which it is intended to use them. Thus, depending on circumstances, the product will be used in the form of spraying powders, solutions in mineral or organic solvents, direct or inverse emulsions, suspensions, granules and so on, containing in addition to the active material fillers and various additives such as wetting agents, emulsifiers, dispersants, adhesives, deflocculants, anticlumping agents and so on, such as those described in Frear's work "Chemistry of Insecticides, Fungicides and Herbicides," 2nd edition, pp. 277–291.

What is claimed is:
1. A compound selected from the group having the general formula:

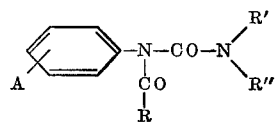

in which R represents a radical selected from the group consisting of 2-, 3- and 4-pyridyl radicals;
R' is selected from the group consisting of hydrogen, or a methyl radical;
R" is selected from the group consisting of optionally substituted alkyl radicals containing from 1–4 carbon atoms, lower-alkoxy radicals and lower-alkoxy-lower alkyl radical;
A is selected from the group consisting of halogen, $NO_2$, lower-alkyl, lower-alkoxy and $CF_3$ radicals and may include one or two identical or different radicals.

2. A compound as claimed in claim 1 wherein A is 4-chloro, R' is methyl, R" is methyl and R is 4-pyridyl.
3. A compound as claimed in claim 1 wherein A is 3,4-dichloro, R' is methyl, R" is methyl and R is 3-pyridyl.
4. A compound as calimed in claim 1 wherein A is 4-chloro, R' is methyl, R" is methyl and R is 3-pyridyl.
5. A compound as claimed in claim 1 wherein A is hydrogen, R' is methyl, R" is methyl and R is 3-pyridyl.
6. A compound as claimed in claim 1 wherein A is 4-methoxy, R' is methyl, R" is methyl and R is 4-pyridyl.
7. A compound as claimed in claim 1 wherein A is 3-$CF_3$, R' is methyl, R" is methyl and R is 4-pyridyl.

References Cited
UNITED STATES PATENTS
3,028,391    4/1962    Rorig _____ 260—294.8

ALAN L. ROTMAN, Primary Examiner

U.S. Cl. X.R.

260—294.8, 294.9, 332.2, 347.3; 71—88, 90, 94; 424—266, 275, 285

UNITED STATES PATENT OFFICE
CERTIFICATE OF CORRECTION

Patent No. 3,542,797            Dated November 24, 1970

Inventor(s) Pierre Poignant, Daniel Pillon and Rodolphe Caffi

It is certified that error appears in the above-identified patent and that said Letters Patent are hereby corrected as shown below:

Column 1, line 59, "substiutted" should be --substitute

Column 2, line 47, "nitrogne" should be --nitrogen--;

Column 3, line 1, "rseults" should be --results--;
Column 3, line 9, "oxyaryl" should be --or aryl--;

Column 4, line 40, after "preemergence" insert --treatme product No. 9 completely destroys such grasses--;

Column 4, line 41, "myosuroids" should be --myosuroides-

Column 6, claim 4, line 25, "calimed" should be --claime

SIGNED AND
SEALED

FEB 23 1971

(SEAL)
Attest:

Edward M. Fletcher, Jr.
Attesting Officer

WILLIAM E. SCHUYLER, JR.
Commissioner of Patents

FORM PO-1050 (10-69)